US008022119B2

(12) United States Patent
Poppe et al.

(10) Patent No.: US 8,022,119 B2
(45) Date of Patent: Sep. 20, 2011

(54) EPOXY AND SILANE GROUP-CONTAINING OLIGOMERS AND POLYMERS AND A METHOD FOR THE PRODUCTION AND THE USE THEREOF

(75) Inventors: Andreas Poppe, Sendenhorst (DE); Mikolajetz Dunja, Ascheberg (DE)

(73) Assignee: BASF Coatings AG, Munster (DE)

( * ) Notice: Subject to any disclaimer, the term of this patent is extended or adjusted under 35 U.S.C. 154(b) by 745 days.

(21) Appl. No.: 11/908,986

(22) PCT Filed: Jan. 28, 2006

(86) PCT No.: PCT/EP2006/050568
§ 371 (c)(1),
(2), (4) Date: Sep. 18, 2007

(87) PCT Pub. No.: WO2006/097387
PCT Pub. Date: Sep. 21, 2006

(65) Prior Publication Data
US 2008/0139733 A1 Jun. 12, 2008

(30) Foreign Application Priority Data
Mar. 18, 2005 (DE) .......................... 10 2005 012 457

(51) Int. Cl.
*C08G 59/50* (2006.01)
*C08L 63/00* (2006.01)
(52) U.S. Cl. ....................................... 523/435; 525/533
(58) Field of Classification Search .................. 523/435; 525/533
See application file for complete search history.

(56) References Cited

U.S. PATENT DOCUMENTS

| | | | |
|---|---|---|---|
| 4,772,672 A | 9/1988 | Isozaki et al. | |
| 5,350,811 A | 9/1994 | Ichimura et al. | |
| 6,534,568 B1 * | 3/2003 | Katz et al. | 523/212 |
| 2006/0004121 A1 * | 1/2006 | Ding et al. | 523/115 |

FOREIGN PATENT DOCUMENTS

| | | |
|---|---|---|
| DE | 3839215 A1 | 6/1989 |
| DE | 4020316 A1 | 1/1992 |
| DE | 19816136 A1 | 10/1999 |
| DE | 19818735 A1 | 10/1999 |
| DE | 19930665 A1 | 1/2001 |
| DE | 10018935 A1 | 10/2001 |
| DE | 10221009 A1 | 12/2003 |
| EP | 0543393 A1 | 5/1993 |
| EP | 0817614 B1 | 8/2002 |
| WO | W09952964 A2 | 10/1999 |

OTHER PUBLICATIONS

International Search Report for PCT/EP2006/050568 dated May 4, 2006.
International Preliminary Report on Patentability for International Application No. PCT/EP2006/050568 dated Oct. 3, 2007.

* cited by examiner

*Primary Examiner* — Mark Eashoo
*Assistant Examiner* — David Karst
(74) *Attorney, Agent, or Firm* — Cantor Colburn LLP

(57) ABSTRACT

Oligomers and polymers containing epoxide groups and silane groups and preparable by reacting (A) at least one low molecular mass, oligomeric or polymeric compound containing at least two epoxide groups (a1) with (B) at least one silane containing (b1) at least one at least divalent organic radical which per se is not hydrolyzable, (b2) at least one cyclic dicarboxylic anhydride group and (b3) at least one silane group containing at least one hydrolyzable group (b31), the cyclic dicarboxylic anhydride groups (b2) being attached to the silane groups (b3) via the radicals (b1), the equivalent ratio of epoxide groups (a1) to dicarboxylic anhydride groups (b2) being 0.7 to 100;

processes for preparing them, and their use for preparing anhydrous curable compositions.

17 Claims, No Drawings

EPOXY AND SILANE GROUP-CONTAINING OLIGOMERS AND POLYMERS AND A METHOD FOR THE PRODUCTION AND THE USE THEREOF

CROSS-REFERENCE TO RELATED APPLICATIONS

This Application is a National Phase Application of Patent Application PCT/EP2006/050568 filed on 28 Jan. 2006, which claims priority to German patent application DE 10 2005 012457.7 filed 18 Mar. 2005, both of which are hereby incorporated by reference.

The present invention relates to new oligomers and polymers containing epoxide groups and silane groups. The present invention also relates to a new process for preparing oligomers and polymers containing epoxide groups and silane groups. The present invention further relates to the use of the new oligomers and polymers containing epoxide groups and silane groups, and of the oligomers and polymers containing epoxide groups and silane groups that are prepared by means of the new process, for preparing anhydrous curable compositions.

Oligomers and polymers containing epoxide groups and silane groups are known for example from German patent application DE 38 39 215 A 1 and from the American patent U.S. Pat. No. 4,772,672. They are prepared by free-radically copolymerizing monomers containing epoxide groups and silane groups.

The known oligomers and polymers containing epoxide groups and silane groups serve to prepare anhydrous, thermally curable coating materials. The known anhydrous, thermally curable coating materials comprise aluminum chelate, titanium chelate or zirconium chelate compounds as thermal curing catalysts.

The known anhydrous, thermally curable coating materials have a long pot life and yield coatings which are impact-resistant, water-resistant, weathering-stable, chemicals-resistant, free from internal contractions, and readily overpaintable. Nevertheless, the scratch resistance of the known coatings leaves much to be desired.

German patent application DE 100 18 935 A1 discloses anhydrous, thermally curable coating materials which comprise low molecular mass compounds, oligomers and polymers containing epoxide groups, plus anhydrides as curing agents. These known coating materials yield coatings which, although exhibiting high substrate adhesion and intercoat adhesion, have a scratch resistance which again leaves much to be desired. They are therefore suitable only for producing primer coats.

For scratchproofing they have to be furnished with aqueous, thermally curable coating materials based on silanes containing epoxide groups (sol-gel systems). These aqueous sol-gel systems, which crosslink via hydrolysis and condensation reactions, have the disadvantages, however, that they are frequently destabilized by the addition of salts and that their stability is heavily dependent on pH. Moreover, it is difficult if not impossible to mix in hydrophobic additives such as light stabilizers homogeneously, which is a very great disadvantage with a view to their use in the automotive sector. In many cases the hydrophobic light stabilizers also catalyze the condensation reactions in the aqueous sol-gel systems, to the great detriment of their storage stability.

It is an object of the present invention to provide new oligomers and polymers containing epoxide groups and silane groups that are preparable easily and with very good reproducibility and that are stable on storage.

The new oligomers and polymers containing epoxide groups and silane groups ought to be outstandingly suitable for preparing anhydrous curable compositions, especially compositions curable thermally or both thermally and with actinic radiation.

The new anhydrous curable compositions ought to be outstandingly suitable for use as coating materials, adhesives, sealants, compounds based on engineering plastics, and curable materials in general, but particularly as coating materials.

The new anhydrous coating materials, adhesives, sealants, compounds based on engineering plastics, and curable materials in general ought to provide coatings, adhesive layers, seals, moldings, self-supporting sheets and rigid foams, especially coatings, having outstanding performance properties.

In particular the new coatings ought to be hard and flexible, impact-resistant, water-resistant, weathering-stable, chemicals-resistant, free from internal contractions and stresses, and, in the case of refinish, readily overpaintable, and ought also to exhibit very good adhesion to substrates and a very good intercoat adhesion. At the same time they should in particular have a very good scratch resistance.

Accordingly we have found the new oligomers and polymers containing epoxide groups and silane groups, which are preparable by reacting
(A) at least one low molecular mass, oligomeric or polymeric compound containing at least two epoxide groups (a1) with
(B) at least one silane containing
   (b1) at least one at least divalent organic radical which per se is not hydrolyzable,
   (b2) at least one cyclic dicarboxylic anhydride group and
   (b3) at least one silane group containing at least one hydrolyzable group (b31),
   the cyclic dicarboxylic anhydride groups (b2) being attached to the silane groups (b3) via the radicals (b1),
the equivalent ratio of epoxide groups (a1) to dicarboxylic anhydride groups (b2) being 0.7 to 100.

The new oligomers and polymers containing epoxide groups and silane groups are referred to below for the sake of brevity as "resins of the invention".

Also found has been the new process for preparing the resins of the invention, which comprises reacting
(A) at least one low molecular mass, oligomeric or polymeric compound containing at least two epoxide groups (a1) with
(B) at least one silane containing
   (b1) at least one at least divalent organic radical which per se is not hydrolyzable,
   (b2) at least one cyclic dicarboxylic anhydride group and
   (b3) at least one silane group containing at least one hydrolyzable group (b31),
   the cyclic dicarboxylic anhydride groups (b2) being attached to the silane groups (b2) via the radicals (b1),
in an equivalent ratio of epoxide groups (a1) to dicarboxylic anhydride groups (b2) of 0.7 to 100 in an aprotic medium or in bulk under inert gas.

The new process for preparing the resins of the invention is referred to below as "process of the invention".

Found not least has been the new use of the resins of the invention and of the resins of the invention prepared by the process of the invention for preparing anhydrous curable compositions, this being referred to below as "use in accordance with the invention".

Further subject matter of the invention will emerge from the description.

In the light of the prior art it was surprising and unforeseeable for the skilled worker that the object on which the present invention was based could be achieved by means of the resins of the invention, the process of the invention, and the use in accordance with the invention.

In particular it was surprising that the resins of the invention and the resins of the invention prepared by the process of the invention were outstandingly suitable for preparing new anhydrous curable compositions, especially compositions curable thermally or both thermally and with actinic radiation.

The curable compositions of the invention were outstandingly suitable for use as new coating materials, adhesives, sealants, compounds based on engineering plastics, and curable materials in general, but particularly as new coating materials.

The coating materials, adhesives, sealants, compounds based on engineering plastics, and curable materials in general of the invention yielded new coatings, adhesive layers, seals, moldings, self-supporting sheets and rigid foams, especially new coatings, having outstanding performance properties.

In particular the coatings of the invention were hard and flexible, impact-resistant, water-resistant, weathering-stable, chemicals-resistant, free from internal contractions and stresses, and, in the case of refinish, readily overpaintable, and exhibited very good adhesion to substrates and very good intercoat adhesion. At the same time they possessed in particular a very good scratch resistance.

The resins of the invention are preparable by reacting
(A) at least one low molecular mass, oligomeric or polymeric compound containing at least two epoxide groups (a1) with
(B) at least one silane containing
  (b1) at least one at least divalent organic radical which per se is not hydrolyzable,
  (b2) at least one cyclic dicarboxylic anhydride group and
  (b3) at least one silane group containing at least one hydrolyzable group (b31),
  the cyclic dicarboxylic anhydride groups (b2) being attached to the silane groups (b3) via the radicals (b1),
in an equivalent ratio of epoxide groups (a1) to dicarboxylic anhydride groups (b2) of 0.7 to 100, preferably 0.9 to 80 and in particular 1.1 to 50.

In the process of the invention the reaction takes place in an aprotic medium or in bulk (without solvent), preferably in an aprotic medium, under inert gas, in particular under nitrogen.

Suitable aprotic media, especially aprotic nonpolar media, are the conventional organic solvents that contain no active hydrogen atoms. Examples of suitable aprotic organic solvents are apparent from the textbook by Dieter Stoye and Werner Freitag (eds.), Paints, Coatings and Solvents, 2nd ed., Wiley-VCH, Weinheim, N.Y., 1998, 14. Solvents, pages 277 to 373.

The reaction is preferably continued until the cyclic dicarboxylic anhydride groups (b2) are no longer detectable, in particular by IR spectroscopy.

The reaction is preferably carried out in the presence of a suitable catalyst. Examples of suitable catalysts are the conventional catalysts for the reactions of epoxide groups with carboxylic anhydrides. Highly suitable catalysts include alkoxylated, especially ethoxylated, fatty amines, especially cocoamines. An especially suitable catalyst is polyoxyethylene(15)cocoamine, which is sold under the brand name Ethomeen® C/25 by Akzo Nobel. The catalysts are used in the conventional effective amounts, preferably in amounts of 0.01% to 5%, more preferably 0.1% to 4% and in particular 0.5% to 3% by weight, based in each case on the sum of the starting products and of the catalyst.

For the process of the invention it is essential that after the reaction there are still always epoxide groups (a1) present in the resins of the invention. This condition is particularly important when an equivalent ratio (a1):(b2) of <1 or only slightly greater than 1, 1.01 for example, is chosen. In that case care must be taken to ensure that in the compounds (A) there are still other reactive functional groups (a2) present, hydroxyl groups for example, which are able to react with the cyclic dicarboxylic anhydride groups (b2).

The resins of the invention are oligomers and polymers.

Oligomers for the purposes of the present invention are compounds composed of 3 to 15 structural subunits which derive from monomers. The transition between oligomers and polymers is generally a fluid one as far as the number of structural subunits is concerned. Polymers are therefore compounds composed of more than 10, in particular more than 15, structural subunits.

The compounds (A) used in accordance with the invention are of low molecular mass or are oligomeric or polymeric in the aforementioned sense. In particular they are of low molecular mass or are oligomeric.

The compounds (A) contain at least two, in particular two, epoxide groups (a1). Preferably the two epoxide groups (a1) are joined in end positions to the backbones of the compounds (A); in other words, they are terminal epoxide groups (a1).

Preferably the compounds (A) are selected from the group consisting of polyaddition resins and polycondensation resins. For the purposes of the present invention, therefore, compounds (A) obtainable by polyaddition and by polycondensation are also embraced.

The compounds (A) are conventional and are described in detail for example in German patent application DE 100 18 395 A1, page 3, paragraph [0020], to page 8, paragraph [0038].

The silane (B) for use in accordance with the invention includes at least one, especially one, at least divalent, in particular divalent, organic radical (b1) which per se is not hydrolyzable.

Examples of suitable radicals (b1) are described in detail in German patent application DE 102 21 009 A1, page 8, paragraphs [0072] to [0074], where they are referred to as divalent organic linking groups L. Trimethylene in particular is used.

The silane (B) further includes at least one, especially one, cyclic dicarboxylic anhydride group (b2), which is joined to one of the silane groups (b3) described below by one of the radicals (b1) described above.

The cyclic dicarboxylic anhydride groups (b2) derive from the conventional cyclic dicarboxylic anhydrides. Examples of suitable cyclic dicarboxylic anhydrides are described in German patent application DE 38 39 215 A1, page 3, line 5, to page 4, line 25. Also suitable are phthalic anhydride, maleic anhydride and succinic anhydride. In particular the cyclic dicarboxylic anhydride groups (b2) derive from succinic anhydride.

The silane (B) includes not least at least one, especially one, silane group (b3) which contains at least one hydrolyzable group (b31), and preferably at least two and in particular three hydrolyzable groups (b31).

Examples of suitable hydrolyzable groups (b31) are known from German patent application DE 100 18 935 A1, page 9, paragraph [0065], to page 10, paragraph [0066]. Ethoxy in particular is used.

Accordingly use is made in particular of 3-(triethoxysilyl) propylsuccinic anhydride as silane (B). It is sold for example under the brand name Geniosil® GF 20 by Wacker Chemie.

The resins of the invention can be put to diverse uses. In particular they are suitable for the use in accordance with the invention, i.e., for preparing new anhydrous curable compositions, especially compositions curable thermally or both thermally and with actinic radiation, which are referred to below as "curable compositions of the invention".

For the purposes of the present invention the curable compositions of the invention are regarded as being anhydrous, when using the conventional methods no water can be detected therein or when only traces of water, entrained unintentionally via the constituents of the curable compositions of the invention, are present therein.

For the purposes of the present invention actinic radiation means electromagnetic radiation such as near infrared (NIR), visible light, UV radiation, X-rays and gamma rays, especially UV radiation, and corpuscular radiation such as electron beams, proton beams, neutron beams, beta rays and alpha rays, especially electron beams.

Preferably the curable compositions of the invention are thermally curable.

Preferably the curable compositions of the invention comprise at least one, especially one, chelate compound. Preferably the chelate compound is selected from the group consisting of aluminum chelate, titanium chelate and zirconium chelate compounds. Examples of suitable chelate compounds are described in detail in German patent application DE 38 93 215 A1, page 14, line 11, to page 15, line 57. They are preferably used in the amounts indicated there.

The curable compositions of the invention may further comprise at least one additive.

Preferably the additive is selected from the group consisting of conventional color and/or effect pigments, organic and inorganic, transparent or opaque fillers, nanoparticles, other oligomeric and polymeric binders, curable physically, oxidatively, thermally, with actinic radiation, or both thermally and with actinic radiation and different from the oligomers and polymers containing epoxide groups and silane groups, crosslinkers for thermal curing, reactive diluents curable thermally and/or with actinic radiation, low and high-boiling ('long'), aprotic, organic solvents, UV absorbers, light stabilizers, free-radical scavengers, deaerating agents, slip additives, polymerization inhibitors, photoinitiators, thermal crosslinking initiators, defoamers, emulsifiers, wetting agents, dispersants, adhesion promoters, flow control agents, film-forming auxiliaries, sag control agents (SCAs), rheology control additives (thickeners), flame retardants, siccatives, dryers, antiskinning agents, corrosion inhibitors, waxes, biocides and flatting agents. Use is made in particular of coatings additives (cf. also the textbook by Johan Bieleman, "Lackadditive [Additives for coatings]" Wiley-VCH, Weinheim, N.Y., 1998, or Rumlömpp Online, Georg Thieme Verlag, Stuttgart, N.Y., 2002, "Additives").

The selection of the additive is guided in particular by the end use envisaged for the curable compositions of the invention. It is important in this respect that the additive must not impair the stability of the curable compositions of the invention and/or the curing and stability of the cured compositions of the invention.

The preparation of the curable compositions of the invention requires no peculiarities in terms of method, but instead takes place in accordance with the conventional methods of preparing curable compositions by means of the conventional mixing techniques and apparatus, such as stirred tanks, agitator mills, extruders, compounders, Ultraturrax, inline dissolvers, static mixers, micromixers, toothed-wheel dispersers, pressure release nozzles and/or microfluidizers, where appropriate in the absence of actinic radiation.

The applicability of the curable compositions of the invention is extraordinarily wide. In particular they may serve as new coating materials, adhesives, sealants, compounds based on engineering plastics, and curable materials in general, but especially as coating materials.

These coating materials of the invention serve to produce new coatings and paint systems; the adhesives of the invention serve to produce new adhesive layers; the sealants of the invention serve to produce new seals; and the compounds of the invention based on engineering plastics, and the curable materials of the invention in general, serve to produce new moldings, particularly optical moldings, self-supporting sheets and rigid foams.

The coatings and paint systems of the invention are outstandingly suitable in particular for protecting surfaces of substrates of any kind from damage due to mechanical exposure, and in particular for protecting them against scratches, and/or for decorating them.

Suitable substrates include all those which are damaged neither superficially nor deep down by the curing of the applied compositions of the invention using heat or both heat and actinic radiation. The substrates may already have been prepainted or precoated with other coatings, bonded with other adhesive layers and/or sealed with other seals.

Suitable substrates are composed for example of metals, plastics, wood, ceramic, stone, textile, fiber composites, leather, glass, glass fibers, glass wool, rock wool, mineral-bound and resin-bound building materials, such as plasterboard and cement slabs or roof shingles, and also assemblies of these materials. The substrates may alternatively be moldings, rigid foams and self-supporting sheets of the invention.

The substrates are, in particular, motorized or muscle-powered means of transport and suspension/float/hover bodies of all kinds for air, land and water, and also parts thereof, especially aircraft (airplanes, helicopters, balloons or airships, for example), floating apparatus (boats, artificial islands or buoys, for example), rail vehicles (engines, wagons, railcars and railroad trolleys, for example), road vehicles (cycles, utility vehicles or automobiles, for example), the interior and exterior of constructions and parts thereof, furniture, windows and doors, small industrial parts, coils, containers, packaging, white goods, sheets, optical components, electrical components, mechanical components, and hollow glassware. Further examples of end uses and substrates are known from German patent application DE 198 16 136 A 1, column 7, line 54, to column 8, line 58, or from international patent application WO 99/52964, page 12, line 10 to page 14, line 4.

On the basis of their particularly advantageous properties the curable compositions of the invention are especially suitable as coating materials of the invention for producing new, high scratch resistance coatings in exposed areas of the substrates, especially automobiles, which are frequently subject to mechanical imposition.

Surprisingly the coating materials of the invention can be provided as new two-component or multicomponent systems. The two-component and multicomponent systems of the invention have a particularly long pot life or processing time.

With particular preference the coating materials of the invention are used for producing high scratch resistance clearcoats of the invention as part of multicoat color and/or effect paint systems in automotive OEM finishing. Preferably these particularly high-value multicoat paint systems of the invention are produced by what are called wet-on-wet methods, such as are known for example from German patent application DE 199 30 665 A 1, page 15, line 15, to page 16, line 24.

In general the electrocoat, surfacer coat, basecoat and clearcoat films are applied at a wet film thickness such that curing thereof results in coats having the thicknesses that are advantageous and necessary for their functions. In the case of the electrocoat this thickness is 10 to 70, preferably 10 to 60, more preferably 15 to 50 and in particular 15 to 45 µm; in the case of the surfacer coat it is 10 to 150, preferably 10 to 120, more preferably 10 to 100 and in particular 10 to 90 µm; in the case of the basecoat it is 5 to 50, preferably 5 to 40, more preferably 5 to 30 and in particular 10 to 25 µm; and in the case of the clearcoats of the invention it is at least 30 to 120, preferably at least 40 to 100, more preferably 50 to 100 and in particular 60 to 100 µm. It is also possible, however, to employ the multicoat system known from European patent application EP 0 817 614 A 1, comprising an electrocoat, a first basecoat, a second basecoat and a clearcoat of the invention, in which the total thickness of the first and second basecoats is 15 to 40 µm and the thickness of the first basecoat is 20% to 50% of said total coat thickness.

The electrocoat, surfacer coat, basecoat and inventive clearcoat films can be cured thermally or both thermally and with actinic radiation (dual cure).

For producing the coatings and paint systems of the invention the coating materials of the invention are applied by means of the appropriate techniques that are conventional for the particular end use, such as spraying, knife coating, brushing, pouring, dipping, impregnating, trickling or rolling, for example. The substrate to be coated may itself be at rest, with the application equipment or unit being moved. Alternatively the substrate to be coated, in particular a coil, may be moved, with the application unit being at rest relative to the substrate or being moved appropriately.

Preference is given to employing spray application methods, such as compressed air spraying, airless spraying, high-speed rotation, or electrostatic spray application (ESTA) for example, in conjunction where appropriate with hot spray application such as hot air spraying, for example. Application may be made at temperatures of max. 70 to 80° C., so that suitable application viscosities are achieved without the brief thermal exposure occasioning changes in or damage to the coating materials of the invention and their overspray, which may be intended for reprocessing. For instance, hot spraying may be configured such that the coating materials of the invention are heated only very shortly in or shortly before the spray nozzle.

The spray booth used for the application may be operated for example with a circulation system that maybe temperature-controllable and which is operated with a suitable absorption medium for the overspray. An example being the coating material of the invention itself.

It is especially advantageous that the coating of the invention can be applied in one step by applying a coating material of the invention, and need not be built up from a plurality of discrete coats.

For producing the moldings of the invention the curable compositions of the invention are poured into suitable hollow molds and cured therein, after which they are separated from the molds.

The compounds of the invention based on engineering plastics are preferably extruded and subsequently injection-molded in suitable hollow molds.

To produce the sheets of the invention the conventional methods such as casting or blown-film extrusion are employed.

For producing the rigid foams of the invention use is made of the techniques that are conventional within the field of foam plastics (cf. Rumlömpp Online, Georg Thieme Verlag, Stuttgart, N.Y., 2002, "foam plastics").

The thermal curing of the coating materials, adhesives, sealants and curable materials in general of the invention may take place after a certain rest time. This may have a duration of 30 seconds to 2 hours, preferably 1 minute to 1 hour and in particular 1 to 45 minutes. The rest time serves, for example, for the flow and degassing of the applied curable materials of the invention, or for the evaporation of volatile constituents. The rest time may be shortened and/or assisted by the application of elevated temperatures, provided this does not entail any damage to or changes in the coating materials, adhesives, sealants and curable materials in general of the invention, such as premature complete crosslinking, for instance.

Thermal curing has no peculiarities in terms of method, but instead takes place in accordance with the conventional methods such as heating in a forced-air oven or irradiation with IR lamps. Thermal curing may also take place in stages. Another preferred method of curing is that of curing with near infrared (NIR) radiation. Suitable techniques of this kind are described for example by Rodger Talbert in Industrial Paint & Powder, 04/01, pages 30 to 33, "Curing in Seconds with NIR" or in Galvanotechnik, volume 90 (11), pages 3098 to 3100, "Lackiertechnik, NIR-Trocknung im Sekundentakt von Flüssig-und Pulverlacken" [painting technology; NIR drying in seconds for liquid and powder coatings].

Thermal curing takes place advantageously at a temperature of 50 to 200° C., more preferably 60 to 180° C. and in particular 80 to 160° C. for a time of 1 minute to 2 hours, more preferably 2 minutes to 1 hour and in particular 3 to 30 minutes.

The curing with actinic radiation is preferably carried out using UV radiation and/or electron beams. It is preferred in this case to employ a dose of 1000 to 3000, preferably 1100 to 2900, more preferably 1200 to 2800, very preferably 1300 to 2700 and in particular 1400 to 2600 mJ/cm$^2$. The radiation intensity is preferably $1 \times 100$ to $3 \times 10^5$ more preferably $2 \times 10^0$ to $2 \times 10^5$ very preferably $3 \times 10^0$ to $1.5 \times 10^5$ and in particular $5 \times 10^0$ to $1.2 \times 10^5$ W m$^{-2}$.

Where appropriate it is possible for the curing to be supplemented with actinic radiation from other sources. In the case of electron beams it is preferred to operate under an inert gas atmosphere. This can be ensured, for example, by supplying carbon dioxide and/or nitrogen directly to the surface of the paint films. In the case of curing with UV radiation it is also possible to operate under inert gas or an oxygen-depleted atmosphere, in order to prevent ozone forming.

Curing with actinic radiation is carried out using the conventional radiation sources and optical auxiliary measures. Examples of suitable radiation sources are flash lamps from VISIT, high-pressure or low-pressure mercury vapor lamps, which may have been doped with lead in order to open up a radiation window up to 405 nm, or electron beam sources. The equipment and conditions for these curing methods are described for example in R. Holmes, U.V. and E.B. Curing Formulations for Printing Inks, Coatings and Paints, SITA Technology, Academic Press, London, United Kingdom 1984. Further examples of suitable techniques and apparatus for curing with actinic radiation are described in German patent application DE 198 18 735 A 1, column 10, lines 31 to 61, by R. Stephen Davidson, in "Exploring the Science, Technology and Applications of U.V. and E.B. Curing", Sita Technology Ltd., London, 1999, or by Dipl.-Ing. Peter Klamann, in "eltosch System-Kompetenz, UV-Technik, Leitfaden für Anwender" [eltosch systems expertise, UV technology, manual for users], October 1998.

In the case or work pieces of complex shape, such as are envisaged for automobile bodies, those regions not accessible to direct radiation (shadow regions), such as cavities, folds and other structural undercuts, can be (partially) cured using point, small-area or all-round emitters, in conjunction with an automatic movement means for the irradiation of cavities or edges.

Curing in this case may take place in stages, i.e., by multiple exposure to light or to actinic radiation. This can also be done in alternation, i.e., by curing alternately with UV radiation and with electron beams.

Where thermal curing and curing with actinic radiation are employed together, these methods may be used simultaneously or in alternation. Where the two curing methods are used in alternation, it is possible, for example, to begin with the thermal curing and to end with the curing with actinic radiation. In other cases it may prove advantageous to begin and to end with curing with actinic radiation.

The resultant coatings, paint systems, adhesive layers, seals, moldings, self-supporting sheets and rigid foams of the invention have outstanding performance properties. Of particular note are their high transparency and clarity and also their particularly high scratch resistance.

The coatings and paint systems of the invention have an outstanding profile of properties which is very well balanced in terms of mechanical properties, optical qualities, corrosion resistance and adhesion. Thus the multicoat paint systems of the invention have the high optical quality and intercoat adhesion required by the market and do not give rise to problems such as lack of condensation resistance, cracking (mud cracking) or flow defects or surface structures in the clearcoats of the invention. In particular the multicoat paint systems of the invention exhibit an outstanding metallic effect, an outstanding DOI (distinctiveness of the reflected image) and an outstanding surface smoothness.

Accordingly, substrates coated for example with at least one coating, paint system or self-supporting sheet of the invention, bonded with an adhesive layer of the invention and/or sealed with a seal of the invention combine a particularly advantageous profile of performance properties with a particularly long service life, so making them particularly valuable economically, esthetically and technically.

EXAMPLES

Example 1

The Preparation of a Resin Containing Epoxide Groups and Silane Groups

A suitable reaction vessel, equipped with stirrer, reflux condenser, thermometer, external heating and nitrogen inlet tube, was charged with

- 13.5 parts by weight of Solventnaphtha®,
- 39.88 parts by weight of epoxy resin (Vantico® 6334 from Vantico; epoxy equivalent weight: 199.38 g/mol),
- 12.18 parts by weight of 3-(triethoxysilyl)propylsuccinic anhydride (Geniosil® GF 20 from Wacker Chemie) and
- 0.52 parts by weight of cocoalkylamine ethoxylate (polyoxy-ethylene(15)cocoamine; Ethomeen® C/25 from Akzo Nobel)

and this initial charge was blanketed with nitrogen. Thereafter the reaction mixture was heated with stirring to 100° C. The progress of the reaction was monitored by means of infrared spectroscopy: after about 30 minutes, anhydride groups were no longer detectable spectroscopically.

The resultant resin containing epoxide groups and silane groups was stable on storage both in solution and in isolation, without solvent, at room temperature and was outstandingly suitable for preparing coating materials in the form of one-component and multicomponent systems, preferably multicomponent systems and in particular two-component systems.

Example 2

The Preparation of a Two-Component System and Preparation of a Coating Material Therefrom As component I of the two-component system the solution of the resin containing epoxide groups and silane groups in Solventnaphtha® from Example 1 was used.

As component II of the two-component system a catalyst based on an aluminum chelate compound was prepared from 20.43 parts by weight of aluminum sec-butoxide and 13.01 parts by weight of ethyl acetoacetate, by mixing the reactants with external cooling and stirring the resulting reaction mixture at room temperature for an hour.

The resulting two-component system was of virtually unlimited tenability at room temperature and was outstandingly suitable for preparing coating materials.

A coating material was prepared by adding 10 parts by weight of component II to 90 parts by weight of component I and thereafter homogenizing the resulting mixture.

The resulting coating material had an advantageously long pot life in tune with practice and had very good application properties. It was outstandingly suitable for use as a clearcoat material for producing multicoat color and/or effect paint systems for automobiles in the OEM sector, for the scratch-proof finishing of exposed areas on motor-vehicle bodies, and as a refinish clearcoat material for automotive refinishing.

Example 3

The Production of a Clearcoat

The clearcoat was produced using the coating material from Example 2. This coating material was applied to glass panels by knife coating in a wet film thickness such that curing at 140° C. for 22 minutes gave a dry film thickness of 25 μm.

The resulting clearcoats were transparent and clear, and were of high gloss and brilliant. Their adhesive strength was outstanding. They were free from stress cracks and other surface defects.

They were additionally scratch-resistant, as underlined using the steel wool scratch test (rating 3).

The steel wool scratch test was carried out using a hammer to DIN 1041 (weight without shaft: 800 g; shaft length: 35 cm). The test panels were stored at room temperature for 24 h prior to the test.

The flat side of the hammer was wrapped with a ply of steel wool, which was fastened at the upturned sides using Tesakrepp adhesive tape. The hammer was placed at right angles onto the clearcoats. The head of the hammer was guided in a track over the surface of the clearcoats without tipping and without additional physical force.

For each test, 100 back-and-forth strokes were performed within a time of about 100 s. After each of these individual tests the steel wool was replaced.

Following exposure, the areas under test were cleaned with a soft cloth to remove the residues of steel wool. The areas under test were evaluated visually under artificial light and rated as follows:

| Rating | Damage |
| --- | --- |
| 1 | none |
| 2 | slight |
| 3 | moderate |
| 4 | moderate to medium severity |
| 5 | severe |
| 6 | very severe |

Evaluation took place immediately after the end of the experiment.

The clearcoats were also chemicals-resistant, as determined by means of the BART.

The BART (BASF ACID RESISTANCE TEST) was used to determine the resistance of paint surfaces to acids, alkalis and water drops. After they had been baked, the clearcoats were exposed to further temperature loads (30 min 40° C., 50° C., 60° C. and 70° C.) in a gradient oven. Beforehand the test substances had been applied (1%, 10% and 36% sulfuric acid, 5% sulfurous acid, 10% hydrochloric acid, 5% sodium hydroxide solution, 1, 2, 3 or 4 drops of DI (i.e., deionized) water) in a defined manner using a metering pipette. Following exposure to the substances, they were rinsed off under running water and the damage was assessed visually after 24 h in accordance with a predetermined scale:

| Rating | Appearance |
| --- | --- |
| 0 | no defect |
| 1 | slight marking |
| 2 | marking/dulling/no softening |
| 3 | marking/dulling/color change/softening |
| 4 | cracks/incipient etching |
| 5 | clearcoat removed |

Each individual mark (spot) was evaluated and the result was recorded in the form of a rating for each test substance:

| Test substance | Rating |
| --- | --- |
| 10% sulfuric acid | 3 |
| 36% sulfuric acid | 3 |
| 10% hydrochloric acid | 1 |
| 6% sulfurous acid | 3 |
| 5% sodium hydroxide solution | 0 |
| DI water | 0 |

The universal hardness in N/mm$^2$ at 25.6, 10 and 5 mN, the creep behavior in % at 25.6 mN and the relative elastic resilience in % were measured in accordance with DIN 55676 by means of a Fischerscope® H100C from Helmut Fischer GmbH, the force being adapted to the coat thickness and the mechanical properties of the clearcoats, so that the depth of penetration was not more than 10% of the coat thickness. The results obtained were as follows:

| | |
| --- | --- |
| universal hardness: | 138, |
| resilience: | 42.67% and |
| creep behavior: | 9.18%. |

The results underline the fact that the clearcoats had high scratch resistance in conjunction with comparatively high hardness and flexibility.

What is claimed is:

1. A composition prepared by reacting:
   at least one compound (A) selected from the group consisting of low molecular mass, oligomeric and low molecular mass, polymeric compounds, each of said compounds having at least two epoxide groups (a1), and
   at least one silane (B) comprising
      at least one radical (b1), having a valency of at least two, that is not hydrolyzable,
      at least one cyclic dicarboxylic anhydride group (b2) and
      at least one silane group (b3) comprising three hydrolyzable groups (b31),
   wherein the at least one cyclic dicarboxylic anhydride group (b2) is attached to the at least one silane group (b3) by the at least one radical (b1), and
   the equivalent ratio of epoxide groups (a1) to the at least one dicarboxylic anhydride group (b2) is 0.7 to 100.

2. The composition of claim 1, wherein the oligomeric and polymeric compounds (A) are selected from the group consisting of polyaddition resins and polycondensation resins.

3. The composition of claim 1, wherein the compound (A) has an epoxide equivalent weight of 70 to 1000 g/mol.

4. The composition of claim 1, wherein the cyclic dicarboxylic anhydride group (b2) is a succinic anhydride group.

5. The composition of claim 1, wherein the equivalent ratio of epoxide groups (a1) to the at least one cyclic dicarboxylic anhydride group (b2) is 1.1 to 50.

6. The composition of claim 1, wherein the at least one silane (B) consists of:
   at least one divalent radical (b1) which is not hydrolyzable,
   at least one cyclic dicarboxylic anhydride group (b2) and
   at least one silane group (b3) comprising three hydrolyzable groups (b31),
      wherein the at least one cyclic dicarboxylic anhydride group (b2) is attached to the at least one silane group (b3) by the at least one radical (b1), and
      the equivalent ratio of epoxide groups (a1) to the at least one dicarboxylic anhydride group (b2) is 0.7 to 100.

7. The composition of claim 1, wherein the three hydrolyzable groups (b31) are ethoxy groups.

8. The composition of claim 1, wherein the at least one silane (B) is 3-(triethoxysilyl)propylsuccinic anhydride.

9. A process for preparing a composition comprising:
   reacting
      at least one compound (A) selected from the group consisting of low molecular mass, oligomeric and low molecular mass, polymeric compound each of said compounds having at least two epoxide groups (a1), and
      at least one silane (B) comprising
         at least one organic radical (b1), having a valency of at least two, that is not hydrolyzable,
         at least one cyclic dicarboxylic anhydride group (b2) and
         at least one silane group (b3) comprising three hydrolyzable groups (b31),
      wherein the at least one cyclic dicarboxylic anhydride groups (b2) is attached to the at least one silane group (b3) by the at least one radical (b1), and
      the equivalent ratio of epoxide groups (a1) to the at least one dicarboxylic anhydride group (b2) is 0.7 to 100, said reacting occurring in at least one of an aprotic medium, or in bulk under inert gas.

10. The process of claim 9, wherein the reaction is carried out in the presence of a catalyst.

11. An anhydrous curable composition prepared by reacting, in at least one of an aprotic medium, or in bulk under inert gas:
- at least one compound (A) selected from the group consisting of low molecular mass, oligomeric and low molecular mass, polymeric compounds, each of said compounds having at least two epoxide groups (a1), and
- at least one silane (B) comprising
  - at least one organic radical (b1), having a valency of at least two, that is not hydrolyzable,
  - at least one cyclic dicarboxylic anhydride group (b2) and
  - at least one silane group (b3) comprising three hydrolyzable groups (b31),
- wherein the at least one cyclic dicarboxylic anhydride group (b2) is attached to the at least one silane group (b3) by the at least one radical (b1), and the equivalent ratio of epoxide groups (a1) to the at least one dicarboxylic anhydride group (b2) is 0.7 to 100.

12. The anhydrous curable composition of claim 11, further comprising at least one chelate compound.

13. The anhydrous curable composition of claim 12, wherein the chelate compound is selected from the group consisting of aluminum chelate, titanium chelate and zirconium chelate compounds.

14. The anhydrous curable composition of claim 11, wherein the anhydrous curable composition is curable by at least one of thermally, with actinic radiation and a combination of both thermally and with actinic radiation.

15. The anhydrous curable composition of claim 11, further comprising at least one additive selected from the group consisting of color and effect pigments; organic and inorganic, transparent and opaque fillers; nanoparticles; other oligomeric and polymeric binders, curable physically, oxidatively, thermally, with actinic radiation, and both thermally and with actinic radiation and different from the oligomers and polymers containing epoxide groups and silane groups; crosslinkers for thermal curing; reactive diluents curable thermally and/or with actinic radiation; low and high-boiling aprotic solvents; organic solvents; UV absorbers; light stabilizers; free-radical scavengers; deaerating agents; slip additives; polymerization inhibitors; photoinitiators; thermal crosslinking initiators; defoamers; emulsifiers; wetting agents; dispersants; adhesion promoters; flow control agents; film-forming auxiliaries; sag control agents (SCAs); rheology control additives; thickeners; flame retardants; siccatives; dryers, antiskinning agents; corrosion inhibitors; waxes; biocides; flatting agents; and mixtures thereof.

16. The composition of claim 11, wherein the anhydrous curable composition is at least one of coating materials, adhesives, sealants, compounds based on engineering plastics, and curable materials.

17. The composition of claim 16, wherein the coating materials provide coatings and paint systems, the adhesives provide adhesive layers, the sealants provide seals, and the compounds based on engineering plastics and the curable materials provide moldings, optical moldings, self-supporting sheets and rigid foams.

* * * * *